(No Model.) 2 Sheets—Sheet 1.

E. W. PERRY, Jr.
SHUTTER FOR PHOTOGRAPHIC CAMERAS.

No. 439,037. Patented Oct. 21, 1890.

Witnesses.
Robert Ewart,
J. A. Rutherford

Inventor.
Enoch W. Perry Jr.
By James L. Norris.
Atty.

THE NORRIS PETERS CO., PHOTO-LITHO., WASHINGTON, D. C.

(No Model.) 2 Sheets—Sheet 2.

E. W. PERRY, Jr.
SHUTTER FOR PHOTOGRAPHIC CAMERAS.

No. 439,037. Patented Oct. 21, 1890.

Witnesses:
Robert Everett
J. A. Rutherford

Inventor:
Enoch W. Perry Jr.
By James L. Norris
Atty.

UNITED STATES PATENT OFFICE.

ENOCH WOOD PERRY, JR., OF NEW YORK, N. Y.

SHUTTER FOR PHOTOGRAPHIC CAMERAS.

SPECIFICATION forming part of Letters Patent No. 439,037, dated October 21, 1890.

Application filed May 31, 1890. Serial No. 353,751. (No model.)

*To all whom it may concern:*

Be it known that I, ENOCH WOOD PERRY, Jr., a citizen of the United States, residing at New York, in the county of New York and State of New York, have invented new and useful Improvements in Shutters for Photographic Cameras, of which the following is a specification.

This invention relates to that type of photographic camera having a main shutter and an auxiliary shutter so relatively arranged and conjointly operating as to effect either instantaneous or time exposures and permit resetting of the main shutter without exposing a film or plate.

The objects of the present invention are to improve and simplify the prior constructions; to provide for the complete movement of the main shutter where instantaneous work is desired, and for a partial movement of the main shutter to place its aperture in coincidence with the lens-opening where time exposure is desired; to provide the holding-latch of the main shutter with two independent actuating devices—one for instantaneous and the other for time exposure; to provide novel and simple means whereby the movement of the main shutter for time exposure can be effected by an off-hand stroke and without dexterous or cautious action on the part of the operator; to provide means whereby the main shutter in its resetting movement acts directly upon and resets the auxiliary shutter, thereby dispensing with a resetting-spring, and to provide novel means for resetting the main shutter and varying the tension of its actuating-spring.

To accomplish all these objects my invention involves the features of construction, the combination or arrangement of devices, and the principles of operation, hereinafter described and claimed, reference being made to the accompanying drawings, in which—

Figure 1:
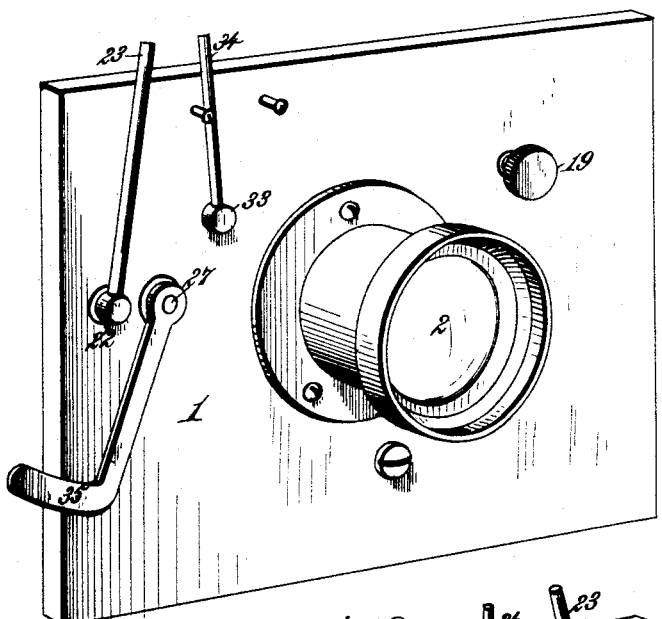
Figure 2:
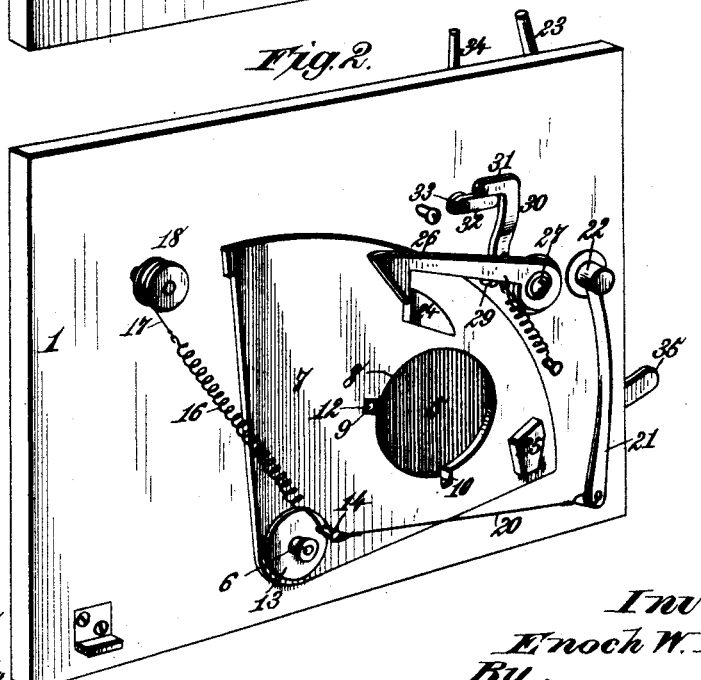
Figure 3:
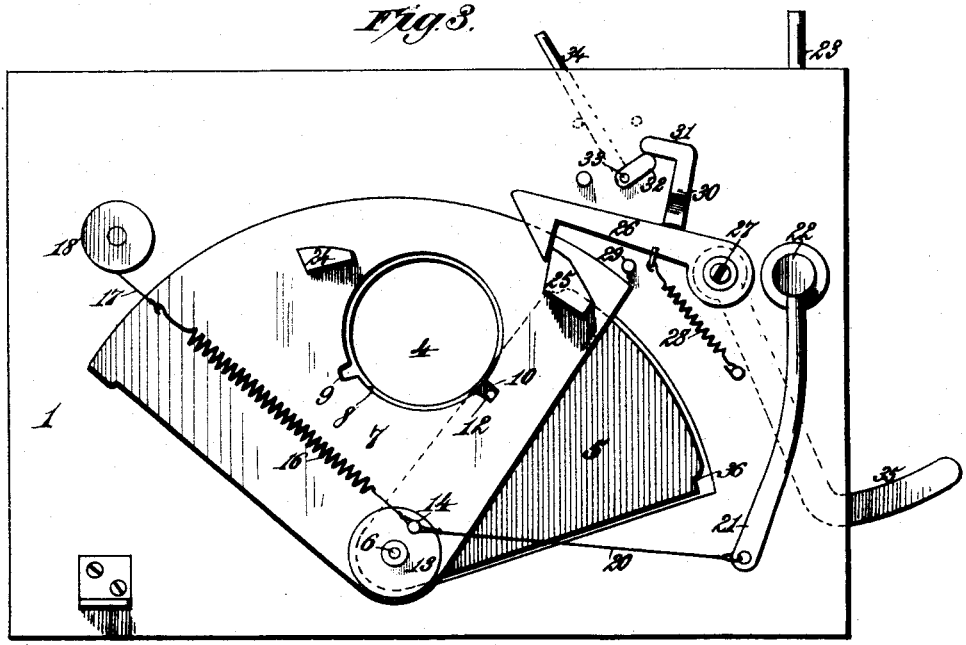
Figure 4:
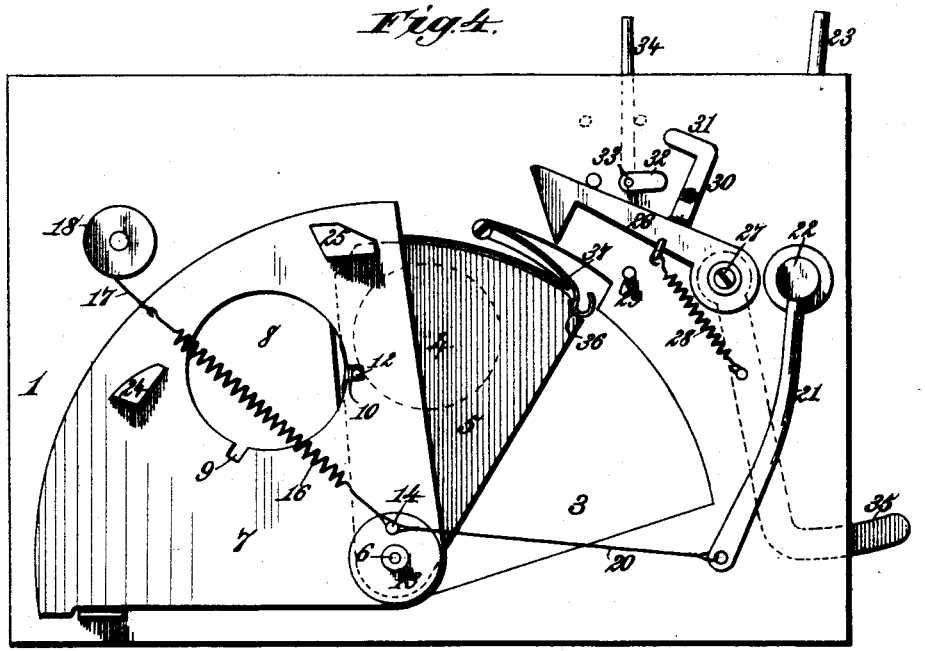

Figure 1 is a perspective view of sufficient of the front portion of a photographic camera to exhibit the lens and the finger-pieces or levers for setting and releasing the shutters. Fig. 2 is a perspective view looking at the inside of the shutter mechanism and showing the shutters set for either instantaneous or time exposure. Fig. 3 is an inside elevation showing the main shutter in position for time exposure. Fig. 4 is a similar view showing the shutters in their closed position as when operated for instantaneous work.

In order to enable those skilled in the art to make and use my invention, I will now describe the same in detail, referring to the drawings, where—

The numeral 1 indicates the front plate or wall of a camera-box, and 2 the lens, the plate or wall having its inside provided with a segmental recess 3, through which is made the lens-opening 4. The auxiliary segmental shutter 5 moves in the recess 3, transverse to the axis of the lens, and is mounted on a pivot-pin 6 at one angle or corner of the recess in such manner that the auxiliary shutter when swung in one direction will cover the lens-opening, and when swung in the opposite direction will uncover the same. The main shutter 7 is also mounted on the pivot-pin 6, and contains the exposing-aperture 8, having in its edges two notches 9 and 10, adapted to receive a stud or pin 12 on the auxiliary shutter. A plate or disk 13, secured to the main shutter and turning therewith on the pivot-pin 6 as a center, is provided with an eccentric-pin 14, and to the pin is secured one end of a suitable shutter-operating spring 16, which is lengthwise expansible and has its opposite end attached to a cord or other filament 17, attached to an axially-turning spindle 18, having a handle 19 at the exterior of the camera-box in such manner that by turning the spindle through the medium of its handle the cord or filament will be wound or unwound, thereby increasing or decreasing the tension of the spring. To the eccentric-pin 14 is also secured one end of a rod or wire 20, connected with a swinging lever-arm 21, which is attached to an axially-turning spindle 22, having a lever-handle 23 at the exterior of the camera-box, whereby the main shutter can be promptly set to the position shown in Fig. 2 by simply swinging the lever-handle. The main shutter is provided with two beveled stops 24 and 25, adapted to abut a beveled latch-lever 26, pivoted to the inside of the camera-box by a spindle 27, and acted on by a suitable spring 28, which normally holds the latch-lever against a stop-pin 29, in which position the beveled end of the latch-lever is in the path of the beveled stops 24 and 25, as represented in Fig. 4. The latch-lever is formed or otherwise provided with an elbow-arm 30, having its extremity 31 overhanging an oscillating cam or eccentric 32, secured to a spindle 33, having a finger-piece 34 at the exterior of the camera-box.

The spindle 27 of the latch-lever 26 is secured to a finger-piece or lever-arm 35, which by downward pressure is swung to turn the spindle 27, and thereby lift the latch-lever independent of any movement of the cam or eccentric 32 or its finger-piece 34.

A partial lifting movement of the latch-lever can be effected by turning the cam or eccentric 32 through the medium of its finger-piece 34. By this means the one latch device is controlled by two finger-pieces, either of which can be operated by an off-hand stroke, whereby instantaneous or time exposures can be obtained without dexterous or cautious action on the part of the operator, as is requisite where one controlling device must be operated to a defined limit for time exposure and to another defined limit for instantaneous work. The beveled stops on the main shutter are so relatively arranged with their latch-engaging ends in different arcs of circles that assuming the parts to be in set position, as in Fig. 2, the movement of the cam or eccentric 32 will lift the latch-lever a sufficient distance to disengage the stop 24, while such latch will still stand in the path of the stop 25 to engage the latter and stop the closing movement of the shutter at the instant the exposing-aperture 8 is in coincidence with the lens-opening 4, thereby providing for indefinite time exposure. If, however, instantaneous work is desired and the parts are set, as in Fig. 2, the main finger-piece or lever-arm 35 is depressed by an off-hand stroke, and so lifts the latch-lever that it clears the path of both beveled stops. By the notches 9 and 10 and the stud or pin 12 the main shutter acts directly on the auxiliary shutter to close the latter and also to reset it. For example, if the notch 9 engages the stud or pin 12, as in the set position Fig. 2, and the main finger-piece 35 is actuated, the main shutter moves back of the auxiliary shutter while the latter stands stationary until the notch 10 engages the stud or pin 12, which occurs at the instant the exposing-aperture of the main shutter coincides with the lens-opening, and the main shutters then act on the auxiliary shutter and both move simultaneously to the closed position. The auxiliary shutter now covers the lens-opening and the main shutter can move back such distance that its exposing-aperture is past the line of the lens-opening, when the notch 9 will engage the stud or pin 12 and both shutters move in unison to the set position shown in Fig. 2.

To prevent accidental shifting of the auxiliary shutter during such times as it should stand stationary while the main shutter moves, I provide the edge of the auxiliary shutter with two recesses 36, into one of which springs the free end of a spring 37, which spring is automatically released when the auxiliary shutter is positively moved by its stud or pin 12 engaging one or the other of the notches 9 and 10.

I do not herein broadly claim a main shutter having an exposing-aperture and an auxiliary shutter acted on directly by the main shutter, whereby the latter serves to positively move the former during a portion of the movement of the main shutter in either direction, as such constitutes the subject-matter of my application, Serial No. 349,746, filed April 28, 1890.

Having thus described my invention, what I claim is—

1. The combination, with a main shutter having a pair of stops and an auxiliary shutter moved to close the lens-opening after exposure, of a latch device adapted to engage each stop and two finger-pieces for independently moving the latch to obtain either time or instantaneous exposures, substantially as described.

2. The combination, with a main shutter having an exposing-aperture and an auxiliary shutter moved to close the lens-opening after exposure, of a latching device for the main shutter and two independent latch-operating mechanisms, each adapted to be operated by off-hand strokes to effect time or instantaneous exposures, substantially as described.

3. The combination, with a main shutter having an exposing-aperture and two stops placed in different paths, and an auxiliary shutter moved to close the lens-opening after exposure, of a latch adapted to engage either stop and means for disengaging the latch from one stop and leaving it in the path of the other stop for time exposure or for moving the latch from the pathway of both stops for instantaneous exposure, substantially as described.

4. The combination, with a main shutter having an exposing-aperture and two stops, and an auxiliary shutter moved to close the lens-opening after exposure, of a latch adapted to engage either stop, and a spindle carrying the latch and having a finger-piece or lever-arm by which to turn it, and a cam or eccentric engaging a part of the latch to operate the latter, substantially as described.

5. The combination, with a main shutter having an exposing-aperture and two stops, and an auxiliary shutter moved by the main shutter to close the lens-opening after exposure, of a latch adapted to engage either stop, a finger-piece or lever-arm for moving the latch from the pathway of both stops for instantaneous exposure, and an independent finger-piece for moving the latch from the path of one stop only for time exposure, substantially as described.

6. The combination, with a pivoted main shutter having an eccentric-pin and an exposing-aperture, and an auxiliary shutter moved by the main shutter to its reset position, of a spring for throwing the main shutter to its closed position, and a resetting lever-arm connected with the eccentric-pin and having a lever-handle at the exterior of the camera-box for resetting the main shutter, substantially as described.

7. The combination, with a main shutter having an eccentric-pin and an exposing-aperture, and an auxiliary shutter moved by the main shutter to close the lens-opening after exposure, of a lengthwise contractile spring connected with the eccentric-pin, a spindle having an operating-handle at the exterior of the camera-box, and a cord or filament connection between the spring and spindle for varying the tension of the spring, substantially as described.

In testimony whereof I have affixed my signature in presence of two witnesses.

ENOCH WOOD PERRY, JR.

Witnesses:
  THOMAS FORD,
  C. L. BATES.